July 28, 1953  J. J. STRNAD  2,646,702
REAMER

Filed Nov. 12, 1949  4 Sheets-Sheet 1

INVENTOR.
JAMES J. STRNAD
BY

July 28, 1953  J. J. STRNAD  2,646,702
REAMER

Filed Nov. 12, 1949  4 Sheets-Sheet 2

INVENTOR.
JAMES J. STRNAD
BY

July 28, 1953
J. J. STRNAD
2,646,702
REAMER
Filed Nov. 12, 1949
4 Sheets-Sheet 3
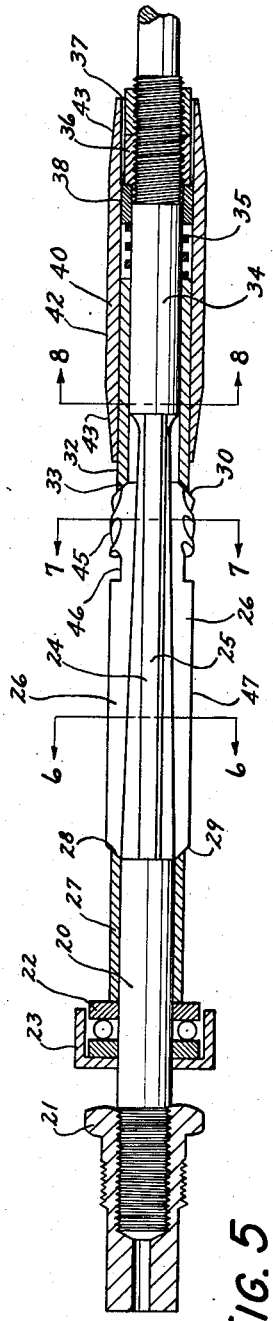
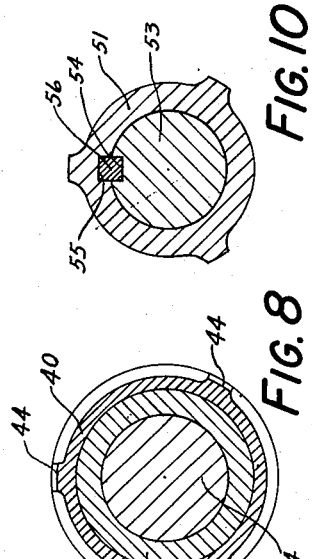
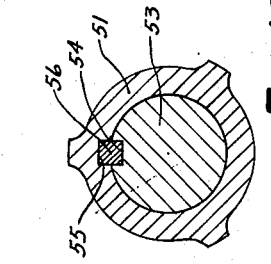
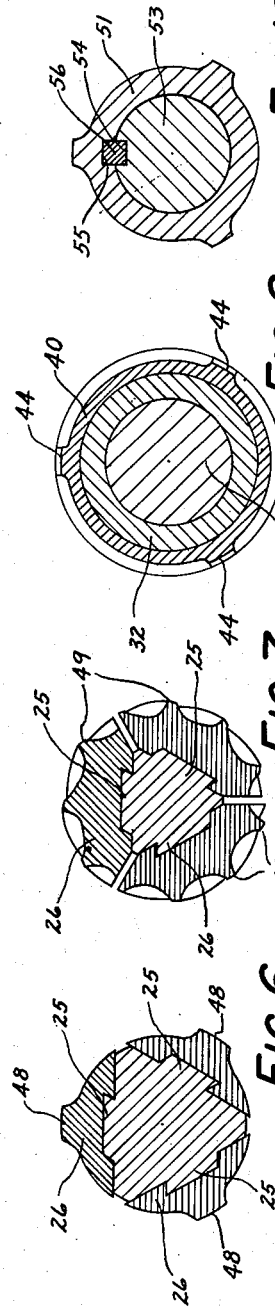
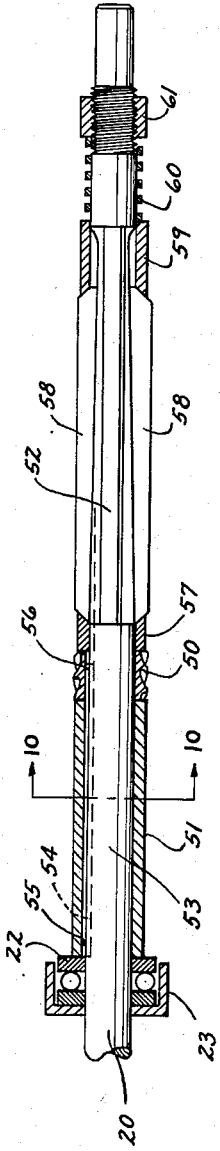
INVENTOR.
JAMES J. STRNAD
BY

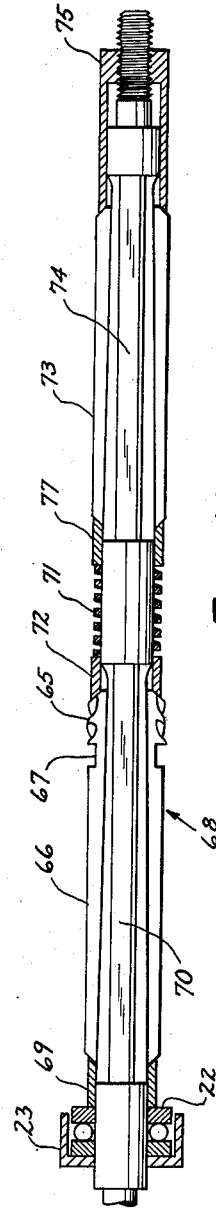
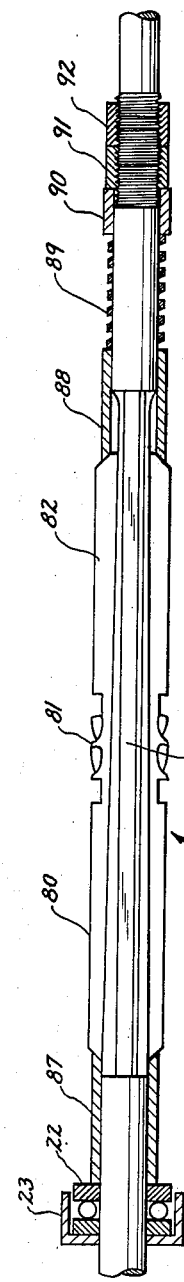
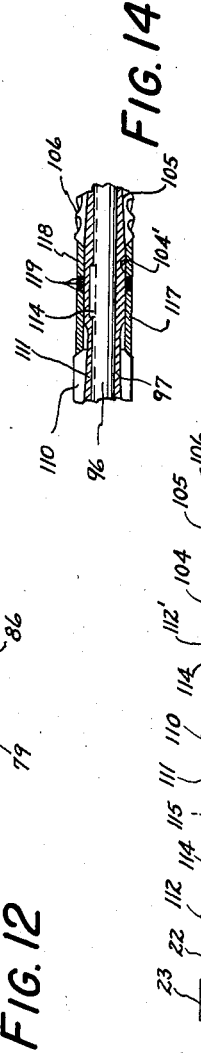

Patented July 28, 1953

2,646,702

UNITED STATES PATENT OFFICE 2,646,702

REAMER

James J. Strnad, Bedford, Ohio

Application November 12, 1949, Serial No. 128,211

10 Claims. (Cl. 77—75.5)

This invention relates to cutting tools and more particularly to reamers of the expansion type, and to a method of use thereof.

The reaming operation is a precision operation and it is therefore desirable to make this operation as accurate as possible. While it is comparatively easy to make a reamer which will finish a hole to a close tolerance on the diameter and which will be round, it is not easy to be certain of the alignment of that hole relative to the work or to other holes in the same work piece. The problem of alignment has been met in most machine shops by use of line reamers with expensive jigs and fixtures or the like. However, these tools and the machines necessarily used in conjunction with them are not economically feasible in many cases.

Reaming is, for example, a frequent operation in the automotive shop, and it is necessary that the holes which are reamed be properly aligned. It frequently happens that the holes reamed are those in the piston in which the wrist pin is inserted which in turn connects the connecting rod to the piston. The piston is customarily formed with two bosses on opposite sides which straddle the connecting rod and in which are bored the holes to receive the wrist pin.

After considerable usage, these holes may become worn somewhat and cause a loose fit of the wrist pin therein. The wearing may cause the hole to become elongated or egg shaped or otherwise out-of-round and may also cause the center lines of the holes to become misaligned with each other or with the axis of the piston or both. If, in the process of rebuilding an engine having pistons thus worn, the holes are reamed so that an oversized wrist pin may be used, it is readily apparent that not only should the size and shape of the holes be accurate but also the alignment. For if the holes should be misaligned relative to each other, the pin would have to be forced into place, thus causing a distortion of the piston, particularly, but also of the pin, and care taken with accurate reaming would be wasted. If the holes should be misaligned relative to the centerline of the piston, the piston would be either canted or twisted or both relative to the connecting rod, thus causing the piston to be misaligned with the cylinder in which it must operate.

Previously, in the smaller shops, it was impossible to be certain that the holes were being reamed in alignment. Because of the misshapen holes started with, tapered pilot members often were not effective to center the work properly. Moreover, the usual method of reaming one hole from one side of the piston, then reversing the work and reaming the other was not fully effective, since the reamer blades have a tendency to be piloted by the worn walls of the old hole.

The present invention relates to a method of reaming holes of this type in proper alignment and to equipment making this task more easy. While I have described in detail the difficulties encountered in reaming holes in pistons, it will be recognized that similar difficulties may be met in other fields where it is desired to have two holes accurately aligned, and that my new method and means are not to be limited strictly to the reaming of holes in pistons.

In addition, I have provided reamers with improved type of piloting means to make possible a more accurate alignment in the reaming of two co-axial holes. These reamers are also useful in reaming a single hole which requires alignment or must be straight.

A more complete understanding of my invention and the invention itself will be learned from the following description and figures which form a part of this specification.

In the drawings:

Fig. 5 is a view partly in section of another type of reamer having one blade removed capable of reaming aligned holes;

Fig. 6 is a sectional view along line 6—6 of Fig. 5;

Fig. 7 is a sectional view along line 7—7 of Fig. 5;

Fig. 8 is a sectional view along line 8—8 of Fig. 5;

Fig. 9 is a view similar to Fig. 5 of an alternative form of my reamer;

Fig. 10 is a sectional view along line 10—10 of Fig. 9;

Fig. 11 is a view similar to Fig. 5 of another alternative form of the reamer;

Fig. 12 is a view similar to Fig. 5 showing a further modification of the reamer of Fig. 11.

Fig. 13 is a view similar to Fig. 5 of still another alternative form of reamer; and Fig. 14 is a partial view of an alternative form of the reamer of Fig. 13.

Briefly, my invention is a method of reaming two holes in alignment which comprises forming at least a witness diameter in each hole by the same tool and at the same time, and then using the witness hole as a pilot in which the reamer will be guided. I also provide means for carrying out this method which makes it more feasible than it has been with prior tools, in the form of an expansion reamer capable of being expanded while it is turned and having blades of sufficient length to cut the witness holes as required by my method. Various alternative forms of the reamer have been developed using a new type pilot means for guiding the cutter parts in a path concentric with the pilot.

Figure 1:
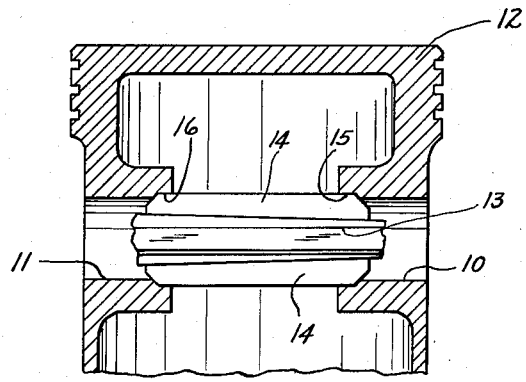
Fig. 1 is a view partly in section showing the initial step of my mew method.
Figure 2:
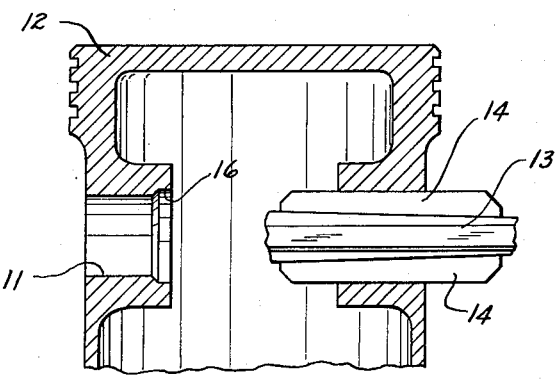
Fig. 2 is a view similar to Fig. 1 showing the completion of the second step of my new method.

More specifically, and referring to the drawings, my invention comprises a method of reaming concentric aligned holes 10 and 11 such as are found in a piston 12 of an ordinary internal combustion engine. The method is best illustrated by Figures 1 and 2. The first step comprises inserting a collapsed expansion reamer 13 into the holes. The reamer must have blades sufficiently long to extend at least a short distance into both holes. After the blades 14 are properly centered so that they will extend into the two holes, the blades are expanded and turned to form a pair of concentric witness holes 15 and 16 which will be concentric and true as to diameter. It is evident that this can be done with any type expansion reamer having sufficiently long blades, although it may be necessary to stop and start the reamer several times to make the adjustments outwardly to the final diameter. I prefer to use machines similar to that described in the copending application of Smole et al., Ser. No. 744,692, filed April 29, 1947, now Patent No. 2,616,225, issued November 11, 1952, to drive a reamer of the type described in the copending application of Wm. J. Blazek, Ser. No. 92,467, filed May 10, 1949. With this machine, it is possible to expand the blades 14 automatically to an accurate diameter while the reamer is rotating. Thus, it would be possible to ream the witness holes to the proper diameter in a single operation.

After the witness holes are reamed to the proper diameter, the piston 12 may be slid over the reamer to complete the first hole 10 as illustrated in Fig. 2. During this operation, the piston is preferably supported but not rigidly positioned at both ends by some means. This may be the customary tapered bushing pilot of a type well known in the art. The piston then is drawn back over the reamer and the second hole 11 is reamed out. Thus, since the witness holes are concentric, the reamer has a true start and a true and aligned pair of holes is made more certain.

Figure 3:
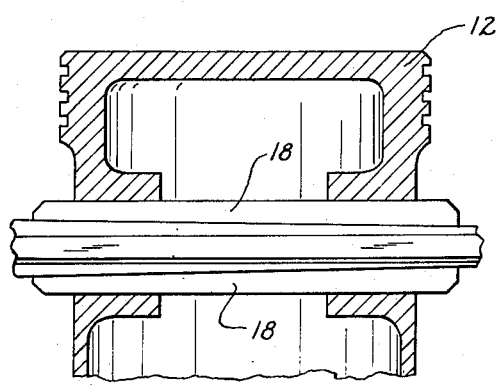
Fig. 3 is a similar view showing a modification of my new method.
Figure 4:
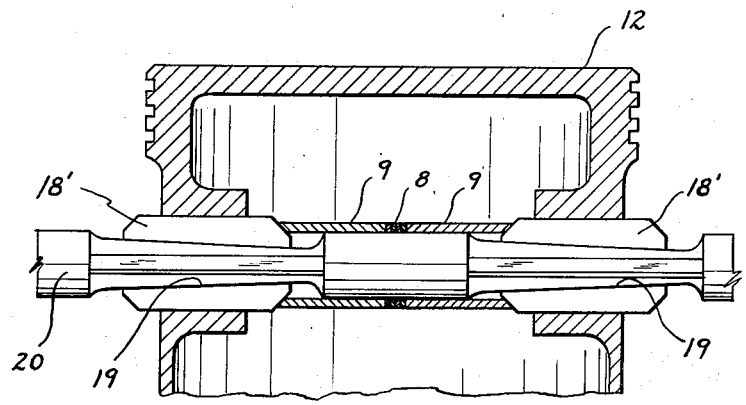
Fig. 4 is a view similar to Fig. 3 illustrating my method as applied to larger pistons.

An even surer method is illustrated in Figs. 3 and 4 in this method as illustrated in Fig. 3, since the reamer blades 18 are long enough to extend completely through both holes, it is necessary only to insert the reamer in place and then expand the reamer to the proper diameter. This eliminates the steps required in the former method whereby the piston was moved relative to the reamer for finishing the holes, and, in addition, provides a pair of holes which are as truly concentric as the accuracy of the reamer makes possible, allowing almost no variation because of careless operation or the like. In the case of a pair of widely spaced holes, it may be desirable to use a reamer as shown in Fig. 4. In this case, two sets of blades 18′ are disposed on the shank 20 on separate tapered portions 19. The blades may be separated by bushings 9 and may be properly spaced by shims 8 to assure equal diameters of the two sets.

A novel reamer, formed to assure concentricity of a pair of holes to be reamed by it, is illustrated in Fig. 5. While this reamer, as illustrated, is adapted for use in the machine of the aforementioned co-pending application it will be recognized by those skilled in the art, that the invention is applicable to hand expansion reamers or even to straight reamers of the non-expansion type, or to wet reamers as described in the aforementioned co-pending application of Blazek.

As illustrated, with one of the blades removed to allow a clearer showing of the structure, the reamer comprises the customary shank 20 threaded into the adaptor bushing 21 which fits the reamer to the machine. Slidably disposed on the shank 20 near the bushing 21 is a thrust bearing 22 enclosed by a cup shaped retainer 23 for engagement by the adjustment mechanism of the driving machine. The shank 20 is formed with a tapered section 24 preferably of triangular cross section having raised lands 25 on which the blades 26 may slide to be adjusted to larger or smaller diameter. Apart from this tapered section 24, the shank is of circular cross section.

In order to utilize the adjustment mechanism of the driving machine, a sliding bushing 27 is provided between the blades 26 and the bearing 22. At the end of the bushing 27 nearest the blades, an interiorly chamfered surface 28 is formed to engage the exteriorly chamfered surface 29 of the blades to hold them against the lands 25. At the opposite end 30 of the blades, a second bushing 32 is provided also having an interiorly chamfered end 33 engaging the end 30 of the blades. The second bushing 32 is slidably disposed on the overhanging end 34 of the shank. A compression spring 35 urges the bushings 27 and 32 and the blades 26 against the bearing 22 and also causes the bushings to press the blades against the lands 25. This spring is secured against movement by a nut 36 threaded onto the end of the shank and which may be fixed in place by a jam nut 37. A bushing 38 may be used to space the spring 35 properly on the shank and to provide journal means for the pilot member 40.

The pilot member 40 is slidably disposed on the bushings 32 and 38. It will be recognized that this member could be replaced by one similar to that described in the aforesaid copending Blazek application. However, it is preferred to use the type here shown. The bushing 32 should preferably be longer than the work to be reamed so that the pilot 40 will at all times be properly journalled on this bushing. The outer surface of the pilot member 40 is preferably knurled at the cylindrical portion 42 in order that the operator may have a better grip. The tapered ends 43 may be formed similarly to each other and are preferably as shown in Fig. 8. Three raised ribs 44 extend the full length of the taper and provide surfaces on which the work piece may center itself. These ribs engage the outer periphery of one of the holes and cause it to be centered on three points of contact. Since these three points determine a circle and a centerline, even though it may not be the original centerline of the hole, the work will be more properly centered than if there were only two point contact as was so often the case with a simple tapered surface engaging an out-of-round hole at two tangent points.

The blades 26 themselves are of novel formation. The portion 45 of the blade nearest the pilot 40, i. e., the first part to enter the work piece, is ground sharp and formed for cutting. The blades may be of any sort, either piloting or end-cutting, and may be stepped as disclosed in the aforementioned Blazek application or not. A relieved diameter 46 is formed in the blades at the end of the cutting portion 45 and is followed by a piloting portion 47. The piloting portion 47 is formed with three ribs 48 as is best shown in Fig. 5. These ribs may be longitudinal of the blade or may be spiral. The latter form may be preferred, since straight longitudinal ribs would be useless in bearings having wide longitudinal oil grooves. The outer surface of the ribs 48 is formed to substantially the same diameter as that of the cutters 49 on the cutting portion 45 and therefore, as the work passes over the cutting portion, it is held in a centered position by the ribs 48 engaged with the inner surface of the hole in the work piece. It will be understood that the proportionate length of the cutting portion 45 and the pilot portion 47 may be varied without departing from the scope of my invention. It is preferable that the pilot portion 47 be at least as long as the work piece, but even this is not absolutely required.

An alternative form of reamer utilizing my invention is illustrated in Figs. 9 and 10. In this embodiment, the cutting portion 50 and following pilot portion 51 are formed on sleeves slidably journalled on a cylindrical portion 52 of the shank 20. A keyway 54 is provided in the shank 20 and a similar keyway 55 in the sleeve to receive a key 56 which holds the sleeve from rotary motion relative to the shank. In the illustrated embodiment, a bushing 57 engages a set of pilot blades 58 formed similarly to the pilot section 47 of the previous embodiment and similarly disposed on a tapered portion 52 of the shank. A bushing 59, spring 60 and retaining nut 61 complete the assembly, thus providing an adjustable leading pilot portion. It will be recognized that this portion could be replaced by a sliding tapered pilot member similar to that described in connection with the first embodiment, and that the reamer could then be constructed in a single piece with no necessity of forming the cutters 50 and the following pilot 51 as sleeves. It is also apparent that the cutters 50 and pilot portion 51 could be formed as a single piece having cutting teeth and piloting ribs. It is, however, preferable to use two pieces, for then each may be replaced individually as it becomes worn.

A second alternative form is shown in Fig. 11. In this embodiment all of the blades are adjustable either manually or by the driving machine. In the particular embodiment shown, the cutting portion 65 and following pilot 66 which are separated by a relief groove 67 are formed together on the blades 68 which are adapted to be adjusted by the machine through the bushing 69 pressing the blades down the tapered portion 70 of the shank. A spring 71 and bushing 72 resist the motion and urge the blades upward on the taper when the bearing 22 is retracted. The leading pilot blades 73 are adjustable manually on a second tapered portion 74 of the shank. This is accomplished by a nut 75 threaded onto the end of the shank and adapted to engage the blades 73. It is obvious that this special nut could be replaced with a nut and bushing arrangement. In either case, it is envisioned that the nut may be grasped by the operator of the machine to tighten it until the pilot blades 73 are just engaged with the inner surface of the hole to be reamed. The other end of the blades is engaged and held in place by a bushing 77 which also serves as a stop for the spring 71. Thus the single spring 71 resists motion of both sets of blades.

As best shown in Fig. 12 only a slight modification of the prior described embodiment is necessary to use a single tapered shank and adjust all sections of the blades by the machine. In this embodiment, the blades 79 are shown as made of a single piece including the following pilot portion 80, the cutters 81, and the leading pilot portion 82. It will be understood that the ribs of the leading pilot 82 must be ground to a somewhat smaller diameter than the cutters 81. As in prior described embodiments, the blades 79 are held onto the shank 86 by a bushing 87 at one end pressed against the blades 79 by the bearing 22. At the other end a similar bushing 88 is urged against the blades by a spring 89 which may be held in place by a spacer 90 engaged by a nut 91 and a jam nut 92.

Still further modification of the reamer is shown in Fig. 13 where the shank is formed with a single tapering portion 95 and a long cylindrical portion 96. A sleeve 97 is slidably disposed on the cylindrical portion 96 adapted to move the leading pilot blades 98 on the taper 95. As before, a bushing 99, spring 100 and nut 101 resist the movement.

The sleeve 97 is formed on its outer surface with two tapered triangular portions separated by a cylindrical screw threaded portion 104. The triangular portions are exactly similar to those formed on the shank and are adapted to receive sliding blades in the same manner. Each end of the sleeve is also cylindrical and screw threaded. On the first tapered portion 105, cutter blades 106 are mounted between a nut 107 on the end of the sleeve 97 and another nut 108 on the center screw threaded portion 104. These nuts may be specially formed as shown to engage the ends of the blades 106, or may be replaced by a nut and bushing arrangement similar to that used in prior described embodiments. Following pilot blades 110 are disposed on the second tapered portion 111 and are also held in place by nuts 112 and 112' in similar manner to the cutter blades. Thus both the following pilot 110 and the cutters 106 are adjustable individually on the sleeve by manually turning the nuts holding the ends of the blades.

Keys 114 fixed in the sleeve 97 but slidable in a keyway 115 on the cylindrical part 96 of the shank provide driving engagement between the shank and the cutter blades 106 and still allow for the longitudinal motion necessary to adjust the leading pilot blades 98.

As shown in Fig. 14, the nuts 108 and 112' could be replaced by a bushing and shim arrangement. In this embodiment, the central portion 104' of the sleeve is cylindrical but not screw threaded. A bushing 117 is provided engaging the ends of the following pilot blades 110 and a similar bushing 118 engages the cutter blades 106. The bushings are spaced apart by a series of shims 119 disposed on the central portion 104' of the sleeve 97. Thus the relation between diameters of cutter and following pilot blades would be fixed by the shims 119 and their actual diameter would be adjusted by the nuts 112 and 107. For example, if the cutter blades were to be sharpened and ground to a somewhat smaller diameter thereby, a shim or group of shims 119 could be removed, thus allowing the cutters to slide upwardly on the taper 111 relative to the following pilot 110 and so be adjusted to the proper relative diameter.

Many other combinations of manually and machine adjusted blades will occur to those skilled in the art. It is also apparent that none of the blades need be adjustable by machine, and that all could be manually adjustable, and that in many cases non-adjustable blades could be substituted for the adjustable ones shown, without departing from the spirit or scope of my invention.

Having thus described my invention, I am aware that numerous and extensive departures may be made therefrom without departing from the spirit or scope of my invention.

I claim:

1. A method of reaming two aligned holes which comprises inserting an expansion reamer into the space between the holes, expanding the reamer and turning it to cut two witness holes, then moving the work relative to the expanded rotating reamer to complete reaming of the first hole and moving the work in the opposite direction relative to the reamer to complete reaming of the second hole.

2. A method of reaming two aligned holes which comprises reaming a witness hole in each of the two holes by a single operation of the reamer, then completing the reaming of each hole using the witness hole as a lead hole to start the reamer.

3. A method of reaming two aligned holes which comprises inserting an expansion reamer into the space between the two holes, expanding the reamer and turning it to cut two witness holes simultaneously and completing the reaming of the two holes using the witness holes as lead holes.

4. An expansion reamer comprising a shank formed with a first cylindrical portion, a tapering portion extending from said cylindrical portion and a second cylindrical portion extending from said tapering portion, a thrust bearing slidably disposed on said first cylindrical portion, a bushing disposed on said shank adjacent said bearing; blades, having a cutter portion and a pilot portion, slidably disposed on said tapered portion engaged by said bushing, a second bushing slidably disposed on said second cylindrical portion engaging the other end of said blades, a spring to urge said second bushing against said blades, nut means to hold said spring in position on said shank and sliding pilot means disposed on said second bushing and formed with three raised ribs for engaging the work.

5. A reamer of the class described comprising a shank having a first cylindrical portion, a tapered portion extending from said first cylindrical portion, a second cylindrical portion extending from said tapered portion, a sleeve slidably journalled on said first cylindrical portion, said sleeve being formed on its external periphery with a cutter portion and a following pilot portion, key means engaged between said shank and said sleeve to provide driving engagement therebetween, leading pilot blades adjustably disposed on said tapered portion adapted to be moved by motion of said sleeve, spring means on said second cylindrical portion adapted to resist outward motion of said blades and nut means on said shank to retain said spring in place.

6. An expansion reamer comprising a driven means having three tapered portions formed thereon, a set of leading pilot blades adjustably disposed on the first of said tapered portions, a set of cutter blades adjustably disposed on the second of said tapered portions and set of following pilot blades adjustably disposed on the third of said tapered portions, at least one of said sets of blades being adjustable solely from the driven end of said driven means.

7. An expansion reamer comprising a shank having a driven end and a free end, said shank being formed with a tapered portion near its free end and a cylindrical portion extending substantially from said tapered portion to said driven end, leading pilot blades adjustably disposed on said tapered portion, nut means threaded on said free end, spring means engaged between said nut means and said blades to urge said blades toward said driven end, a sleeve slidably disposed on said cylindrical portion adapted to move said blades against the urging of said spring, key means engaged between said shank and said sleeve to provide driving relationship therebetween, said sleeve being formed with tapered exterior surfaces and cutter and following pilot blades adjustably disposed on said tapered surfaces.

8. An expansion reamer comprising a shank having a driven end and a free end, said shank being formed with a tapered portion near its free end and a cylindrical portion extending substantially from said tapered portion to said driven end, leading pilot blades adjustably disposed on said tapered portion, nut means threaded on said free end, spring means engaged between said nut means and said blades to urge said blades toward said driven end, a sleeve slidably disposed on said cylindrical portion adapted to move said blades against the urging of said spring, key means engaged between said shank and said sleeve to provide driving relationship therebetween, said sleeve being formed with two tapered portions, cutter blades adjustably disposed on the first of said tapered portions and following pilot blades adjustably disposed on the second of said tapered portions.

9. An expansion reamer comprising a shank having a driven end and a free end, said shank being formed with a tapered portion near its free end and a cylindrical portion extending substantially from said tapered portion to said driven end, leading pilot blades adjustably disposed on said tapered portion, nut means threaded on said free end, spring means engaged between said nut means and said blades to urge said blades toward said driven end, a sleeve slidably disposed on said cylindrical portion adapted to move said blades against the urging of said spring, key means engaged between said shank and said sleeve to provide driving relationship therebetween, said sleeve being formed with two tapered portions, cutter blades adjustably disposed on the first of said tapered portions and following pilot blades adjustably disposed on the second of said tapered portions, said cutter and following pilot blades being adjustable independently of each other.

10. An expansion reamer comprising a shank having a driven end and a free end, said shank being formed with a tapered portion near its free end and a cylindrical portion extending substantially from said tapered portion to said driven end, leading pilot blades adjustably disposed on said tapered portion, nut means threaded on said free end, spring means engaged between said nut means and said blades to urge said blades toward said driven end, a sleeve slidably disposed on said cylindrical portion adapted to move said blades against the urging of said spring, key means engaged between said shank and said sleeve to provide driving relationship therebetween, said sleeve being formed with two tapered portions, cutter blades adjustably disposed on the first of said tapered portions and following pilot blades adjustably disposed on the second of said tapered portions, shim means disposed on said sleeve between said cutter blades and said following pilot blades to provide for adjustment of either blades relative to the other.

JAMES J. STRNAD.

References Cited in the file of this patent

UNITED STATES PATENTS

| Number | Name | Date |
|---|---|---|
| 1,113,067 | Taylor | Oct. 6, 1914 |
| 1,579,102 | Gale | Mar. 30, 1926 |
| 1,592,166 | Turner | July 13, 1926 |
| 1,699,003 | Maupin | Jan. 15, 1929 |
| 1,712,079 | Kattrein | May 7, 1929 |
| 1,877,177 | Beard | Aug. 23, 1932 |
| 1,894,937 | Berry | Jan. 24, 1933 |
| 1,946,584 | Judge | Feb. 13, 1934 |
| 1,982,719 | Woerner | Dec. 4, 1934 |
| 2,030,846 | Bishton | Feb. 18, 1936 |
| 2,091,628 | Carlson | Aug. 31, 1937 |
| 2,284,522 | Keen | May 26, 1942 |

FOREIGN PATENTS

| Number | Country | Date |
|---|---|---|
| 442,329 | Great Britain | Feb. 6, 1936 |